United States Patent Office 3,155,395
Patented Nov. 3, 1964

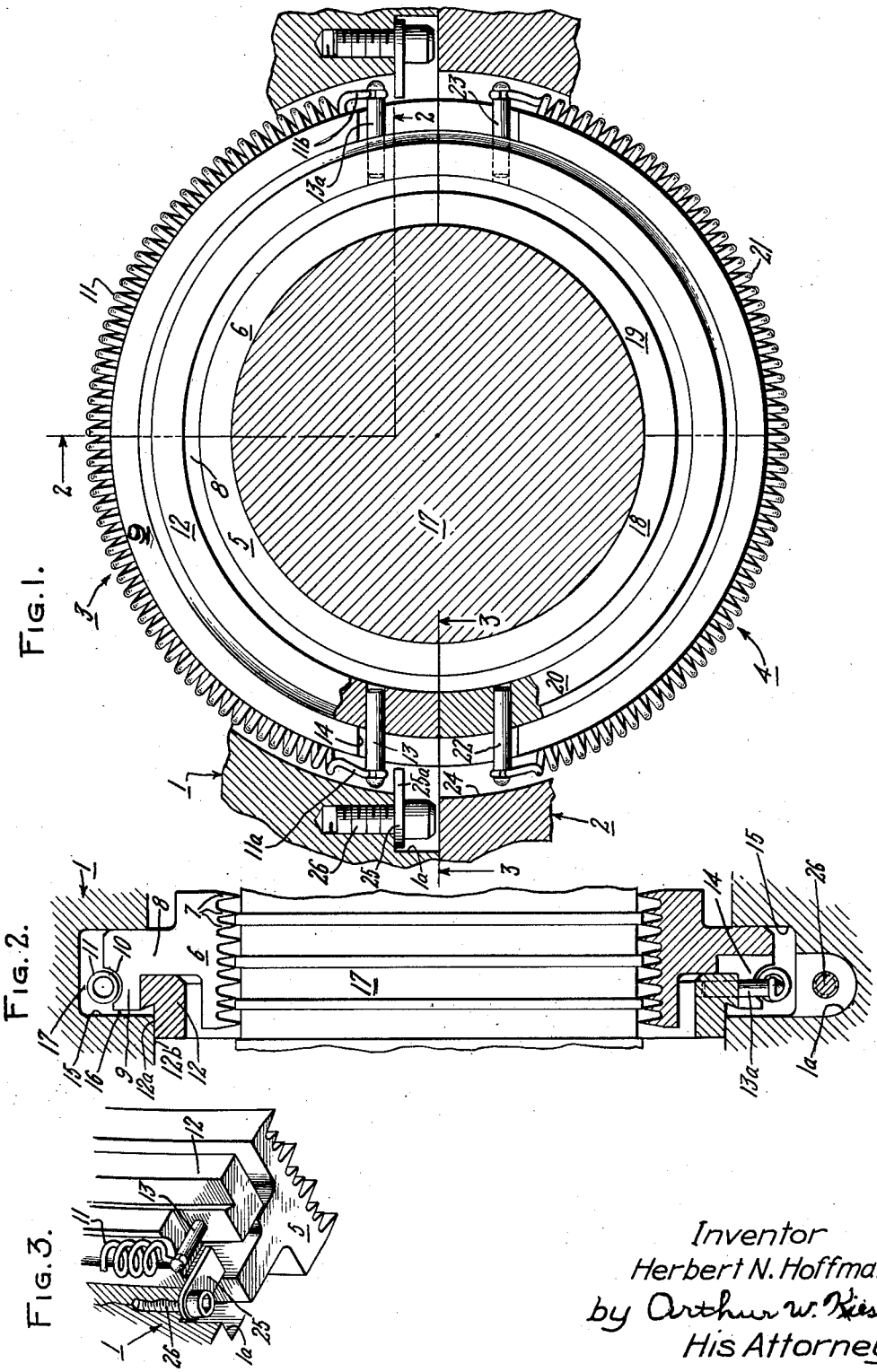

3,155,395
SHAFT PACKING ASSEMBLY
Herbert N. Hoffman, Lunenburg, Mass., assignor to General Electric Company, a corporation of New York
Filed Sept. 12, 1963, Ser. No. 308,497
5 Claims. (Cl. 277—163)

This invention relates to shaft seals or packings, particularly to a labyrinth type packing assembly as used in steam turbines to prevent the leakage of high pressure motive fluid along the shaft from one stage to the next, or to the exterior of the turbine casing.

Labyrinth shaft packings of the general type to which the present invention relates are disclosed in the patents to E. M. Phillips, 1,855,890 issued April 26, 1932, and F. L. Hargrove, 2,600,991 issued June 17, 1952, both assigned to the assignee of the present application. These comprise a plurality of segmental packing members disposed around the turbine shaft and having a T-shaped or L-shaped radial projection supported in an internal groove in the turbine casing. The Phillips patent illustrates the "single hook" type labyrinth packing having the L-shaped radial extension identified 5 in FIG. 1 of that patent supported on an internal shoulder 8 of the packing support member 3. The Hargrove patent represents the so-called "double hook" type of packing having a T-shaped radial projection 17 (FIG. 2 of Hargrove) engaging oppositely disposed internal shoulders 19. It will be obvious from these prior patents that machining the internal shoulders for supporting these double or single hook-type shaft packing segments represents a manufacturing operation of considerable difficulty. This is particularly important since the diameter of these internal shoulders determines the radial spacing of the packing segments relative to the shaft, and therefore this machining operation must be performed with the greatest accuracy. For instance, in some turbine casings of the type to which the invention is intended to be applied, a boring bar on the order of three feet in length may be required to machine these internal shoulders. As will be appreciated by those acquainted with the art, a number of special tools and a complex machining operation is necessary to produce casing grooves with such shoulders, and the upper and lower halves of the turbine casings must be secured together when the final cut is taken, so that the complete circumferential shoulder can be machined at the same time.

The primary purpose of the present invention is to provide an improved segmental labyrinth shaft packing of the type described which eliminates the necessity for the expensive and troublesome machining operation of the internal supporting shoulders in the turbine casings.

A further object is to provide an improved labyrinth shaft packing which is more readily assembled and disassembled since it employs two pre-assembled packing assemblies which may be simply inserted in a radial direction into a plain annular groove in the turbine casing.

A still further object is to provide an improved labyrinth shaft packing which is more readily removed for inspection, servicing, and replacement of worn parts than has been the case with similar packing assemblies used heretofore.

Other objects and advantages will become apparent from the following description taken in connection with the accompanying drawings, in which FIG. 1 is a transverse view, partly in section, of a complete shaft packing assembly incorporating the invention, FIG. 2 is a longitudinal sectional view of the packing assembly taken on the broken plane 2—2 in FIG. 1, and FIG. 3 is a perspective view of an end portion of one of the two semi-circular packing assemblies, looking upward from underneath.

Briefly stated, the invention is practiced by providing a plurality of segmental labyrinth shaft packing members divided into two groups, each group being supported on a semi-circular "centering lip ring" member, the packing segments having a single hook portion engaging the outer periphery of the centering lip ring, with a "garter spring" surrounding thhe packing segments to hold them in position on the respective semi-circular centering lip ring members.

Referring now more particularly to the drawings, FIG. 1 shows the shaft packing supported in upper and lower halves of a turbine casing identified 1, 2 respectively. As is usual in the steam turbine art, these casings are divided along a horizontal axial plane and are secured together by suitable bolts or studs (not shown). The complete shaft packing assembly comprises an upper half identified generally 3, and a lower half identified 4, each comprised of the following elements.

The upper packing half 3 is composed of two 90° labyrinth packing segment members 5, 6, the cross section shape of which may be seen in FIG. 2, where it will be observed that the segment 6 has a plurality of circumferentially extending sealing "teeth" 7, a radially extending flange portion 8, and an axially extending "hook" portion 9. The external periphery of the hook portion 9 defines a semi-circular groove 10 arranged to receive a peripheral garter spring 11.

The two labyrinth packing segments 5, 6 are supported on a semi-circular "centering lip ring" 12, shown in cross section in FIG. 2 and in plan view in FIG. 1, partly in section at the lefthand end thereof, to show the means by which the garter spring 11 is secured to the centering lip ring. This securing means comprises an essentially radially extending dowel pin 13 disposed in a hole in the centering lip ring 12 and projecting radially through a cutout 14 in the hook 9 of the end portion of packing segment 5. The extreme end of the dowel pin 13 has a circumferential groove receiving the hook shaped end portion 11a of the garter spring 11.

As will be apparent in FIG. 1, the other 90° labyrinth shaft packing segment 6 has a similar radially extending dowel pin 13a to which is hooked the opposite end portion 11b of garter spring 11.

It will be apparent that the garter spring 11 thus serves to hold the two 90° labyrinth segments 5, 6 to the centering lip half-ring 12, so that segments and half-ring form an intergral assembly which may be handled in the shop, and assembled and disassembled from the turbine casing as a unit. It will be seen in FIG. 2 that this integral half-packing assembly merely slides radially into the plain U-shaped groove 15 machined in the upper turbine casing 1.

As will be understood by those acquainted with such shaft packings, the lefthand side of FIG. 2 represents the high-pressure side of the packing, and that fluid pressure acting on the lefthand end surfaces of the centering lip ring 12 and the packing segment 6 forces the entire assembly to the right, so that the radially extending portions 8 of the packing segments are held in sealing engagement with the adjacent radially extending surface of the groove 15. On the other hand, there is a substantial clearance space 16 defined between the packing segments and the lefthand side of the groove 15. There is also a substantial radial clearance 17 between the garter spring and outer peripheral surface of the groove 15. The shaft packing assembly is centered in a radial direction in the groove 15 by the carefully machined fit of the external peripheral portion 12a of centering ring 12 in the casing bore 12b.

The lower half 4 of the shaft packing assembly comprises identical 90° packing segments 18, 19 supported on a centering lip ring 20 and retained by garter spring 21 connected to the dowel pins 22, 23. It will be observed that the lower portion of FIG. 2 represents a view looking up from underneath the righthand end of the upper packing assembly 3, as indicated by the broken plane 2—2 in FIG. 1.

It will be apparent from the above description of the construction that the method of assembly of this shaft packing assembly is exceedingly simple. The labyrinth segments 18, 19 are first disposed adjacent the outer periphery of the semicircular centering lip ring member 20, the pins 22, 23, inserted, and the garter spring 21 assembled around the outer periphery of the packing segments and hooked to the outer ends of the pins 22, 23. The completed lower shaft packing sub-assembly 4 is then simply dropped radially downward into the groove 24 in the lower turbine casing 2.

The upper shaft packing assembly 3 is likewise assembled and, with the upper turbine casing 1 in inverted position, the shaft packing assembly may likewise be dropped radially into the plain annular groove 15.

It will be apparent that when the turbine casing 1 is turned over for assembly onto the lower half 2, the upper packing assembly 3 would fall out unless appropriately retained in place. To this end, small retainer plate members 25 are provided, having a portion disposed in a recess 1a in the upper turbine casing 1, and secured therein by a machine screw 26. The retainer plate member has a righthand end portion 25a projecting radially inwardly so as to engage the outer end of the garter spring dowel pin 13 if the upper shaft packing assembly 3 tries to drop downwardly. As shown in FIG. 1, a similar retainer plate assembly is provided to engage the outer end portion of the dowel pin 13a. Thus these retainer devices prevent the upper shaft packing assembly 3 from dropping out of the turbine casing 1 when it is inverted for assembly on the lower casing 2. They also serve to prevent the packing assemblies from shifting circumferentially in the groove 15 in the event the shaft rubs on the packing teeth 7. FIG. 3 shows in perspective the relation of the retainer plate members 25 and their fastening screws 26, relative to the dowel pin 13 and the garter spring 11.

It will be seen that the invention provides a much simplified shaft packing assembly composed of two independently assembled subassemblies which are readily inserted in a radial direction into plain annular grooves in the upper and lower turbine casing halves, the upper assembly being secured by simple retainer devices to prevent it from falling out during assembly of the upper turbine casing on the lower casing half. This arrangement eliminates the need for machining the very expensive and troublesome internal shoulders required by the labyrinth packing assemblies of the prior art, as represented by the Hargrove and Phillips patents mentioned above.

In the event of the need for inspection and servicing of the labyrinth shaft packing segments, the upper turbine casing half is merely removed and the half-packing assemblies removed radially from the grooves in the casings, whereupon the two subassemblies are readily inspected and disassembled for replacement or repair of any of the components found to have suffered damage by rubbing on the shaft, or otherwise.

This the invention provides a shaft packing assembly which is more easily manufactured in the first place by reason of the division of the packing assembly into the upper and lower subassemblies respectively, which are readily disposed in the plain annular grooves in the turbine casing, the whole arrangement providing substantial manufacturing savings by reason of the elimination of the troublesome machining of the accurately dimensioned internal shoulder in the casing members required by the prior art devices.

While only one specific embodiment of the invention has been described, it will be apparent that certain modifications may be made. For instance, there may be three or more arcuate packing segments supported by each of the semi-circular centering lip rings, instead of the two segments used here. Likewise, the retaining devices for preventing the upper packing subassembly from falling out of the upper casing member when it is inverted over the lower casing member could take many forms.

It is also conceivable that the turbine casing might be subdivided into three or four sections, there being a packing subassembly for each casing section. It is of course intended to cover by the appended claims all such modifications as fall within the true spirit and scope of the invention.

What I claim as new and desire to secure by Letters Patent of the United States is:

1. A shaft packing assembly comprising at least two subassemblies, each consisting of:
    an arcuate centering lip ring member,
    a plurality of arcuate segmental packing members supported on the centering lip ring member, each packing segment having an inner peripheral portion adapted to be supported in fluid sealing relation with the outer periphery of a shaft disposed through the packing assembly, each packing segment having also a radially outwardly extending flange portion with an axially extending hook portion supported on a first outer peripheral portion of the centering lip ring member,
    and a garter spring disposed around the outer periphery of said packing hook portions,
    the centering lip ring member having abutment members adjacent either end thereof, each connected to an end of the garter spring.

2. A shaft packing assembly in accordance with claim 1 in which the abutment members to which the garter spring is secured consist of essentially radial dowel pin members disposed in the end portions of the centering lip ring member and having radially outer end portions engaging hooked end portions of the garter spring.

3. A shaft packing assembly in accordance with claim 1 in which the arcuate centering lip ring member has a second outer peripheral portion adapted to engage a circular bore in a casing member for accurately centering the packing assembly relative to a shaft disposed therethrough.

4. A shaft packing assembly including at least two subassemblies, each comprising:
    an arcuate support member,
    a plurality of packing segment members carried on the arcuate support member,
    each packing segment having an inner peripheral portion adapted to define a fluid sealing relation with the outer periphery of a shaft disposed through the packing assembly, each packing segment having also a radially outwardly projecting portion with an axially extending portion disposed over an outwardly facing peripheral surface of the arcuate support member,
    a longitudinally extensible resilient member disposed around the outer periphery of the packing segments and biasing them radially inwardly against the arcuate support member, and
    means securing the ends of the resilient member to the respective end portions of the arcuate support member.

5. A packing assembly for a shaft disposed in a casing divided into at least two casing sections along an axial plane, the casing sections cooperating to form a circular bore for receiving the shaft packing assembly, the packing assembly comprising at least two subassemblies, each consisting of:
    an arcuate centering lip ring member,
    a plurality of arcuate packing segment members supported on the centering lip ring member,
    each packing segment having an inner peripheral portion adapted to be supported in fluid sealing relation with the outer periphery of a shaft disposed through the packing assembly, each packing segment having also a radially outwardly extending flange portion with an axially extending hook portion suported on a first outer peripheral portion of the centering lip ring member, a garter spring disposed around the outer periphery of said packing segment hook portions to bias them radially inwardly against said first outer peripheral portion of the centering lip ring member, means on either end of the centering lip ring member connected to an end of the garter spring, the central bore of the casing sections including circumferential portions adapted to closely fit a second peripheral portion of said centering lip ring members disposed axially adjacent said first outer peripheral portion of the centering lip ring member, the casing sections defining also a plain circumferential groove receiving the outwardly extending flange portions of said packing segment members, said flange portions of the packing segments defining a radially extending surface adapted to be biased into sealing engagement with the adjacent surface of said circumferential casing groove by a pressure differential existing across the packing during normal operation, and retainer means secured to at least one of said casing sections adjacent either end of the arcuate packing segment support member and disposed to prevent the packing subassembly from being accidentally dislodged from or shifting circumferentially in said circumferential casing groove.

References Cited in the file of this patent

UNITED STATES PATENTS

| | | |
|---|---|---|
| 1,855,890 | Phillips | Apr. 26, 1932 |
| 2,600,991 | Hargrove | June 17, 1952 |
| 2,729,481 | Chambers et al. | Jan. 3, 1956 |
| 2,908,516 | Stein | Oct. 13, 1959 |